United States Patent

Ogawa

(10) Patent No.: US 7,653,541 B2
(45) Date of Patent: Jan. 26, 2010

(54) SPEECH PROCESSING DEVICE AND METHOD, AND PROGRAM FOR RECOGNITION OF OUT-OF-VOCABULARY WORDS IN CONTINUOUS SPEECH

(75) Inventor: Hiroaki Ogawa, Chiba (JP)

(73) Assignee: Sony Corporation, Tokyo (JP)

( * ) Notice: Subject to any disclaimer, the term of this patent is extended or adjusted under 35 U.S.C. 154(b) by 885 days.

(21) Appl. No.: 10/502,169

(22) PCT Filed: Nov. 12, 2003

(86) PCT No.: PCT/JP03/14342

§ 371 (c)(1),
(2), (4) Date: Jul. 20, 2004

(87) PCT Pub. No.: WO2004/047075

PCT Pub. Date: Jun. 3, 2004

(65) Prior Publication Data

US 2005/0143998 A1    Jun. 30, 2005

(30) Foreign Application Priority Data

Nov. 21, 2002    (JP) .............................. 2002-337892

(51) Int. Cl.
*G10L 15/04*    (2006.01)
*G10L 15/18*    (2006.01)
*G10L 15/00*    (2006.01)

(52) U.S. Cl. .................. 704/251; 704/252; 704/253; 704/254; 704/257; 704/231

(58) Field of Classification Search .................. 704/215, 704/251–257
See application file for complete search history.

(56) References Cited

U.S. PATENT DOCUMENTS

| 5,956,668 A | * | 9/1999 | Alshawi et al. | ................. | 704/2 |
| 5,983,180 A | * | 11/1999 | Robinson | ..................... | 704/254 |
| 6,389,395 B1 | * | 5/2002 | Ringland | ..................... | 704/254 |

(Continued)

FOREIGN PATENT DOCUMENTS

JP    6 266386    9/1994

(Continued)

OTHER PUBLICATIONS

A.L. Gorin, S.E. Levinson and A. Sankar, "An Experiment in Spoken Language Acquisition", IEEE Trans. Speech and Audio Processing, vol. 2, No. 1, pp. 224-239, 1994.*

(Continued)

*Primary Examiner*—David R Hudspeth
*Assistant Examiner*—Paras Shah
(74) *Attorney, Agent, or Firm*—Frommer Lawrence & Haug LLP; William S. Frommer; Thomas F. Presson

(57) ABSTRACT

A speech processing device and a speech processing method, a storage medium, and a program decreases deletion errors and increases a speech recognition rate. A network of words and syllables is generated, and the network has two kinds of paths: paths that do not contain a particular syllable and paths that contain the syllable at a position corresponding to a boundary between words. Thus, an optimal sub-word sequence on the network is selected for an input utterance.

12 Claims, 20 Drawing Sheets

U.S. PATENT DOCUMENTS

| | | | |
|---|---|---|---|
| 6,631,349 B1* | 10/2003 | Ishiwatari et al. | 704/239 |
| 6,952,675 B1* | 10/2005 | Tahara et al. | 704/255 |
| 7,249,017 B2* | 7/2007 | Lucke et al. | 704/251 |
| 7,310,600 B1* | 12/2007 | Garner et al. | 704/234 |
| 7,337,116 B2* | 2/2008 | Charlesworth et al. | 704/254 |
| 2001/0012994 A1* | 8/2001 | Komori et al. | 704/231 |
| 2001/0053974 A1* | 12/2001 | Lucke et al. | 704/240 |
| 2002/0013706 A1* | 1/2002 | Profio | 704/254 |
| 2002/0032566 A1* | 3/2002 | Tzirkel-Hancock et al. | 704/241 |

FOREIGN PATENT DOCUMENTS

| | | |
|---|---|---|
| JP | 9 6385 | 1/1997 |
| JP | 9 81181 | 3/1997 |
| JP | 9 274496 | 10/1997 |
| JP | 10 91185 | 4/1998 |
| JP | 10 97270 | 4/1998 |
| JP | 11 85179 | 3/1999 |
| JP | 2001 92485 | 4/2001 |
| JP | 2001-249684 | 9/2001 |

OTHER PUBLICATIONS

A. Asadi, R. Schwartz, and J. Makhoul, "Automatic modeling for adding new words to a large vocabulary continuous speech recognition system," in Proc. ICASSP, 1991, pp. 305-308.*

B.-H. Juang and S. Furui, "Automatic recognition and understanding of spoken language—A first step towards natural human-machine communication," Proc. IEEE, 88, 8, pp. 1142-1165, 2000.*

Kai A,. and Seiichi Nakagawa. Comparison of continuous speech recognition systems with unknown-word processing for speech disfluencies. Systems and Computers in Japan, vol. 29. No. 9, 1998.*

Schaaf, Thomas (2001): "Detection of OOV words using generalized word models and a semantic class language model", In EUROSPEECH-2001, 2581-2584.*

Nishizaki, H. and Nakagawa, S. 2002. Japanese spoken document retrieval considering OOV keywords using LVCSR system with OOV detection processing. In Proceedings of the Second international Conference on Human Language Technology Research (San Diego, California, Mar. 24-27, 2002.*

Ogawa, "Robot Taiwa ni okeru Shizen na Shinki Goi no Kakutoku", The Japanese Society for Artificial Intelligence AI Challenge Kenkyukai (Dai 16 Kai), Nov. 22, 2002, pp. 13 to 18.

Nakawatase, Kimoto Nakagawa, "Tokeiteki Shuho ni yoru Jisho Mitoroku no Kakutokuho", The Transactions of the Institute of Electronics, Information and Communication Engineer, D-II, Feb. 25, 1998, vol. J8I-D-II, No. 2, pp. 238 to 248.

Ohnishi Shigehiko et al., "sound recognition of unregistered words arisen from two word classes by a subword model", Fall, 2001, p. 183-184.

Hanazawa Toshiyuki et al., "modification discussion of unknown word detection method using a sound typewriter", Fall, 1992, p. 219-220.

Issam Bazzi and James R Glass: "Modeling Out-of-Vocabulary Words for Robust Speech Recognitioni" International Conference on Spoken Language Processing, Oct. 16, 2000, pp. 433-436, XP007011058.

Helmut Lucke and Masnori Omote: "Automatic Word Acquisition from Continuous Speech" EUROSPEECH 2001, vol. 4, Sep. 3, 2001-Sep. 7, 2001, pp. 2667-2670, XP007004944.

* cited by examiner

FIG. 3

| FEATURES | • 16bit 16KHz sampling |
| --- | --- |
| | • Frame period 10msec |
| | • Frame length 25msec |
| | • 12th-order MFCC, first-order regression coefficient of 0 to 12th-order MFCC (25 dimensions) |
| ACOUSTIC MODEL | • 16mixture,1000tied-state HMM |
| LANGUAGE MODEL | • Sub-word trigram |
| | • Cut-off trigram 5, bigram 5 |

FIG. 4

| RECOGNITION ACCURACY | 40.2 |
|---|---|
| SUBSTITUTION ERROR | 22.4 |
| DELETION ERROR | 33.3 |
| INSERTION ERROR | 4.1 |

FIG. 7

| CLUSTER ID | CATEGORY NAME |
|---|---|
| 1 | USER NAME |
| 2 | ROBOT NAME |
| 3 | USER NAME |
| 4 | USER NAME |

```
$USER_NAME_ACQUISITION = {WATASHI | BOKU} [ NO NAMAE ] WA <OOV>[ DESU ];
$CHARACTER_NAME_ACQUISITION = KIMI [ NO NAMAE ] WA <OOV>[ DAYO ];
$OTHER = KONNICHIWA | SAYOUNARA | <OOV>$ACTION SHITE ;
$UTTERANCE       =       $USER_NAME_ACQUISITION
                      $CHARACTER_NAME_ACQUISITION | $OTHER ;
( <START>$UTTERANCE<END> )
...
```

```
score(<START> WATASHI NO NAMAE WA <OOV> DESU <END>)
= P(<START> WATASHI NO NAMAE WA <OOV> DESU <END>)

= P(<START>) P(WATASHI |<START>) P(NO |<START> WATASHI) P(NAMAE |<START> WATASHI NO)
  P(WA |<START> WATASHI NO NAMAE) P(<OOV> |<START> WATASHI NO NAMAE WA)
  P(DESU |<START> WATASHI NO NAMAE WA <OOV>)
  P(<END> |<START> WATASHI NO NAMAE WA <OOV> DESU)

≈ P(<START>) P(WATASHI |<START>) P(NO |<START> WATASHI) P(NAMAE |WATASHI NO)
  P(WA |NO NAMAE) P(<OOV> |NAMAE WA) P(DESU |WA <OOV>)
  P(<END> |<OOV> DESU)
  ⋮
```

| w1 | w2 | w3 | P(w3\|w1 w2) |
|---|---|---|---|
| <START> | WATASHI | NO | 0.12 |
| WATASHI | NO | NAMAE | 0.01 |
| NO | NAMAE | WA | 0.20 |
| NAMAE | WA | <OOV> | 0.10 |
| WA | <OOV> | DESU | 0.44 |
| <OOV> | DESU | <END> | 0.87 |

| RECOGNITION ACCURACY | 48.5 |
|---|---|
| SUBSTITUTION ERROR | 31.9 |
| DELETION ERROR | 11.6 |
| INSERTION ERROR | 8.0 |

FIG. 18

| CORRECT ANSWER | RECOGNITION RESULT |
|---|---|
| KU RO SA KI | KU RO TA CHI |
| KU RO SA KI | O RO SA |
| KU RO SA KI | RO SA KI |
| KU RO SA KI | RO SA KI |
| KU RO SA KI | KU RO SA KI |
| KA ZU MI | KA ZU MI |
| KA ZU MI | KA TSU NI |
| KA ZU MI | KA ZU MI |
| KA ZU MI | KA TSU MI |
| KA ZU MI | KA SU MI |

FIG. 20

| REGULAR EXPRESSION | OPERATION |
|---|---|
| /KIMI(.)+WA<OOV>/ | REGISTER CLUSTER ID CORRESPONDING TO <OOV> AS ROBOT NAME |
| /(WATASHI BOKU)(.)+<OOV>/ | REGISTER CLUSTER ID CORRESPONDING TO <OOV> AS USER NAME |

```
$SYLLABLE = A | I | U | ... | KA | KI | ... | TA | sp ;
$OOV = { $SYLLABLE } ;
$UTTERANCE = (WATASHI | BOKU)[NO NAMAE] WA $OOV DESU ;
( <START>$UTTERANCE<END> )
  :
```

131

SPEECH PROCESSING DEVICE AND METHOD, AND PROGRAM FOR RECOGNITION OF OUT-OF-VOCABULARY WORDS IN CONTINUOUS SPEECH

This application is a 371 of PCT/JP03/14342, filed Dec. 4, 2003, which claims the benefit of Japanese application 2002-337892, filed Nov. 21, 2002, the entirety of which are hereby incorporated by reference.

TECHNICAL FIELD

The present invention relates to a speech processing device, a speech processing method, a storage medium, and a program and, in particular, to a speech processing device, a speech processing method, a storage medium, and a program for extracting an unknown word contained in input sound signals and easily registering it during continuous speech recognition.

BACKGROUND ART

In speech recognition systems capable of acquiring new vocabularies, in order to acquire the new vocabularies, unknown parts in speech must be estimated and pronunciations must be assigned to the unknown parts.

To estimate the unknown parts, the speech is recognized based on units shorter than a word (sub-word), such as a phoneme or a syllable. A sequence of syllables is assigned to the utterance, that is, readings in Japanese Kana are assigned. Concurrently, a score for each syllable is computed. A score for an out-of-vocabulary (OOV) word is then estimated by appropriately penalizing the scores. In the case of word recognition, since words other than normal word candidates may be unknown words, the above-described scores are used for the words other than the normal word candidates. Thus, if the utterance contains an unknown word and a score for the unknown word is between that of an incorrect word and that of a correct word, the unknown part is recognized as an unknown word. Subsequently, in order to assign a pronunciation to the unknown part, the above-described sub-word sequence, for example, the syllable sequence is referenced based on time information of the unknown part from a syllable typewriter. This allows the syllable sequence assigned to the unknown word to be estimated (for example, refer to "Proceedings of International Conference Spoken Language Processing (ICSLP) 2000" by Issam Bazzi and James R. Glass, October 2000, pp. 433-436 (hereinafter referred to as "Non-Patent Document 1), "Comparison of Continuous Speech Recognition Systems with Unknown Word Processing for Speech Disfluencies" by Atsuhiko KAI and Seiichi NAKAGAWA, Journal of the Institute of Electronics, Information and Communication Engineers of Japan, Vol. J80-D-II, pp. 2615-2625, October, 1997 (hereinafter referred to as "Non-Patent Document 2), and "Efficient Decoding Method for OOV word Recognition with Subword Models" by Hiroaki KOKUBO, Shigehiko ONISHI, Hirofumi YAMAMOTO, and Genichiro KIKUI, Journal of the Information Processing Society of Japan, Vol. 43, No. 7, pp. 2082-2090, July, 2002 (hereinafter referred to as "Non-Patent Document 3)).

Unfortunately, in the case of a syllable search, although a score for a syllable can be acquired, the boundary between words does not necessarily match the boundary between syllables. Such a mismatch between word and syllable boundaries will now be described with reference to FIG. 1.

The times corresponding to the boundaries between words acquired by word sequence search do not necessarily match the times corresponding to boundaries between sub-words acquired by sub-word sequence search. For example, as shown in FIG. 1, when the result of the word recognition is word1<OOV>word2, in terms of boundaries between <OOV> and the adjacent words, the boundaries between the words sometimes do not match the boundaries in the sub-word sequence (i.e. sub-word sequence Sy11 to Sy18). Herein, <OOV> is a symbol representing an unknown word. In FIG. 1, the boundaries before and after <OOV> temporally correspond to halfway points of Sy14 and Sy17, respectively. Accordingly, the sub-words Sy14 and Sy17, which correspond to the mismatched boundaries, are sometimes included in <OOV> and are sometimes excluded from <OOV>. To acquire the pronunciation of <OOV>, the boundaries of the sub-words must be determined.

A method for determining boundaries between sub-words by using sub-word sequences is known. The method, namely, the method for acquiring the pronunciation of <OOV> by sub-word sequences will now be described with reference to FIG. 2.

In the method for acquiring the pronunciation of <OOV> by sub-word sequences, after normal speech recognition and recognition by a syllable typewriter, if a syllable contains the time, defined by the syllable-typewriter, at each end of <OOV> and 50% or more of its duration is contained in <OOV>, the syllable becomes part of <OOV>.

For example, as shown in FIG. 2, part of a recognized word sequence is "word 1", <OOV>, and "word 2". Part of a sub-word sequence from a syllable typewriter is syllable i, syllable j, syllable k. In this case, since L1>L2, where L1 is the time duration of the syllable i corresponding to the word 1 and L2 is the time duration of the syllable i corresponding to <OOV>, it is determined that the syllable i is not included in <OOV>. On the other hand, since L3>L4, where L3 is the time duration of the syllable k corresponding to <OOV> and L4 is the time duration of the syllable k corresponding to the word 2, it is determined that the syllable k is included in <OOV>.

FIGS. 3 and 4 show an experimental result of the method for acquiring the pronunciation of <OOV> by sub-word sequences.

For example, an experiment by the method for acquiring the pronunciation of <OOV> by sub-word sequences shown in FIG. 2 was performed for 752 types of utterances of 12 people (6: male, 6: female) in a travel application, including utterances for hotel check-in and ordering at a restaurant. The conditions of feature parameters, an acoustic model, and a language model were set as shown in the FIG. 3. The feature parameters were set to 16-bit and 16 KHz sampling, a 10-msec frame period, a 25-msec frame length, 12th-order Mel Frequency Cepstrum Cofficients (MFCC), and first-order regression coefficient of 0 to 12th-order MFCC (25 dimensions). The acoustic model was a 16-mixture and 1000 tied-state Hidden Markov Model (HMM). The language model was a sub-word trigram, Cut-off trigram 5, and biagram 5. In this experiment, 314 types of syllables and syllable chains were used as sub-words. The language model used was a phoneme trigram trained with a corpus from six years of Nihon Keizai Shimbun articles.

FIG. 4 shows the performance in terms of recognition accuracy, substitution error, deletion error, and insertion error of sub-word sequences in percent when the method for acquiring the pronunciation of <OOV> by sub-word sequences shown in FIG. 2 is applied to the sub-word sequences. As used herein, the term "substitution error" refers to an error wherein a correct syllable is substituted by another syllable, the term "deletion error" refers to an error wherein a syllable to be recognized is not recognized at all, and the term "insertion error" refers to an error wherein a syllable not to be recognized appears in the recognition result. The recognition accuracy Acc is determined by the total number of syllables N, the number of correct answers N_C, and the number of insertion errors N_I according to the following equation (1):

$$Acc=(N\_C-N\_I)/N \qquad (1).$$

With reference to FIG. 4, in the method for acquiring the pronunciation of <OOV> by sub-word sequences shown in FIG. 2, the recognition accuracy was 40.2%. The deletion error rate and insertion error rate were 33.3% and 4.1%, respectively.

However, in the method for acquiring the pronunciation of <OOV> by sub-word sequences shown in FIG. 2, continuous word recognition must perform word recognition while considering the boundaries of syllables. Additionally, for example, as shown in FIG. 4, since the recognition accuracy of 40.2% is not so high and the deletion error rate of 33.3% is high, users may sometimes deem a robot incorporating this continuous speech recognition system to be unintelligent. Further, as shown in FIG. 4, compared to the deletion error rate of 33.3%, the insertion error rate of 4.1% was unbalanced.

DISCLOSURE OF INVENTION

Accordingly, it is an object of the present invention to provide increased recognition rate and balanced occurrences of deletion errors and insertion errors in speech recognition.

According to the present invention, a speech processing device includes recognition means for recognizing a continuous input utterance, unknown word determination means for determining whether or not a result of recognition by the recognition means contains an unknown word, network generating means for generating a network having paths including sub-words at times corresponding to word boundaries on both sides of the unknown word and a path not including the sub-words if the unknown word determination means determines that the result of recognition by the recognition means contains the unknown word, acquiring means for acquiring a word corresponding to the unknown word if the unknown word determination means determines that the result of recognition by the recognition means contains the unknown word, and registering means for registering the word acquired by the acquiring means while associating the word with other information.

The speech processing device may further include pattern determination means for determining whether or not the result of the recognition matches a predetermined pattern, wherein the registering means registers the word if the result of the recognition matches the predetermined pattern.

The speech processing device may further include response generating means for generating a response corresponding to the input utterance when the unknown word determination means determines that the result of the recognition does not contain an unknown word or the pattern determination means determines that the result of the recognition does not match the predetermined pattern.

The registering means may register the word while associating the word with a category serving as the other information.

The registering means may register the other information while associating the other information with the matched pattern if the pattern determination means determines that the result of the recognition matches the pattern.

The acquiring means may acquire the word by clustering the unknown words.

The network generated by the network generating means may be a network of words and syllables.

The speech processing device may further include selecting means for selecting a path having the highest score in the network based on matching between the input utterance and the network, and pronunciation acquiring means for acquiring a pronunciation for the unknown word based on the network containing the path selected by the selecting means.

The speech processing device may further include comparison means for comparing an acoustic score obtained by matching a predetermined duration of the input utterance against known words with an acoustic score obtained by recognition of a syllable typewriter, wherein the comparison means estimates that the duration corresponds to an unknown word if the acoustic score by recognition of a syllable typewriter is superior to the other score.

The comparison means may compare the acoustic score obtained by matching a predetermined duration of the input utterance against known words with the acoustic score obtained by recognition of a syllable typewriter after the comparison means corrects the acoustic score obtained by recognition of a syllable typewriter.

According to the present invention, a speech processing method includes a step of recognizing a continuous input utterance, a step of determining whether or not a result of recognition in the recognition step contains an unknown word, a step of generating a network having paths including sub-words at times corresponding to word boundaries on both sides of the unknown word and a path not including the sub-words if the determining step determines that the result of recognition contains the unknown word, a step of acquiring a word corresponding to the unknown word if the determining step determines that the result of recognition contains the unknown word, and a step of registering the word acquired in the acquiring step while associating the word with other information.

According to the present invention, a storage medium stores a program including a step of recognizing a continuous input utterance, a step of determining whether or not a result of recognition in the recognition step contains an unknown word; generating a network having paths including sub-words at times corresponding to word boundaries on both sides of the unknown word and a path not including the sub-words if the determining step determines that the result of recognition contains the unknown word, a step of acquiring a word corresponding to the unknown word if the determining step determines that the result of recognition contains the unknown word, and a step of registering the word acquired in the acquiring step while associating the word with other information.

According to the present invention, a program allows a computer to execute a step of recognizing a continuous input utterance, a step of determining whether or not a result of recognition in the recognition step contains an unknown word, a step of generating a network having paths including sub-words at times corresponding to word boundaries on both sides of the unknown word and a path not including the sub-words if the determining step determines that the result of recognition contains the unknown word, a step of acquiring a word corresponding to the unknown word if the determining step determines that the result of recognition contains the unknown word, and a step of registering the word acquired in the acquiring step while associating the word with other information.

In the speech processing device, the speech processing method, the storage medium, and the program according to the present invention, a continuous input utterance is recognized. A network is generated if an unknown word is included in the recognition result. A pronunciation for the unknown word is acquired based on the network. A word corresponding to the unknown word is acquired, and the word is registered while being associated with other information.

BRIEF DESCRIPTION OF THE DRAWINGS

FIG. 3 shows a diagram for explaining experimental conditions in the case of the method for acquiring the pronunciation of <OOV> by sub-word sequences shown in FIG. 2;

FIG. 4 shows experimental results in the case of the method for acquiring the pronunciation of <OOV> by sub-word sequences shown in FIG. 2;

FIG. 7 is a diagram showing a registration of words;

FIG. 12 shows an example of a grammar used in a language model database;

FIG. 14 shows an example of computation of a language score by using a tri-gram;

FIG. 15 shows an example of a tri-gram database;

FIG. 17 shows experimental results according to the present invention;

FIG. 18 shows experimental results according to the present invention;

FIG. 20 shows an example of a template;

FIG. 21 shows an example of a grammar including a function of a syllable typewriter.

BEST MODE FOR CARRYING OUT THE INVENTION

Figure 1:
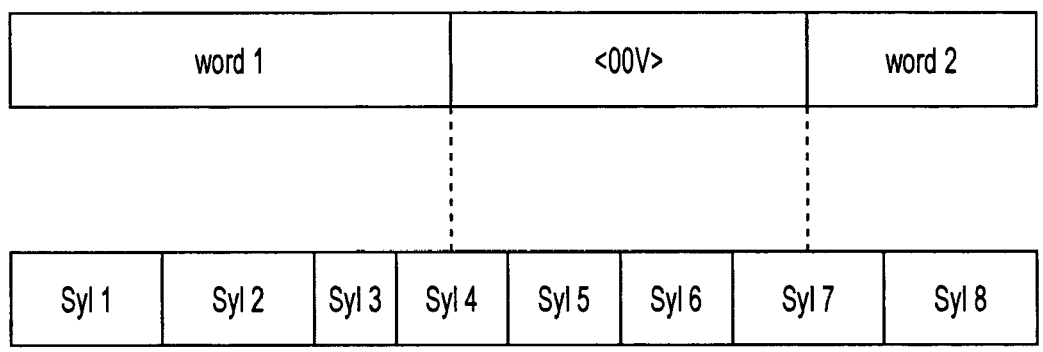
FIG. 1 shows a diagram for explaining mismatching between boundaries in a word sequence and in sub-word sequences.
Figure 2:
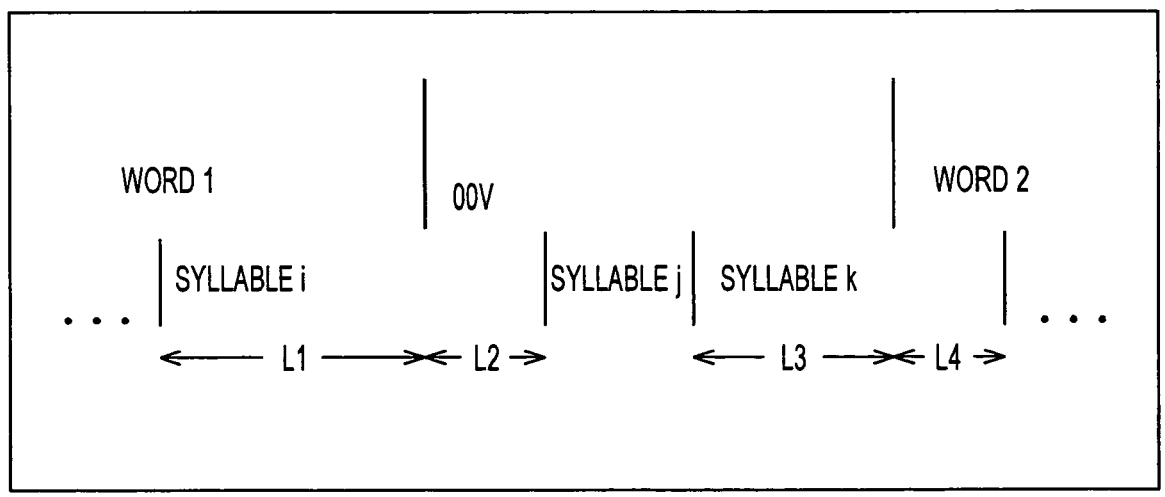
FIG. 2 shows a diagram for explaining the method for acquiring the pronunciation of <OOV> by sub-word sequences.
Figure 5:
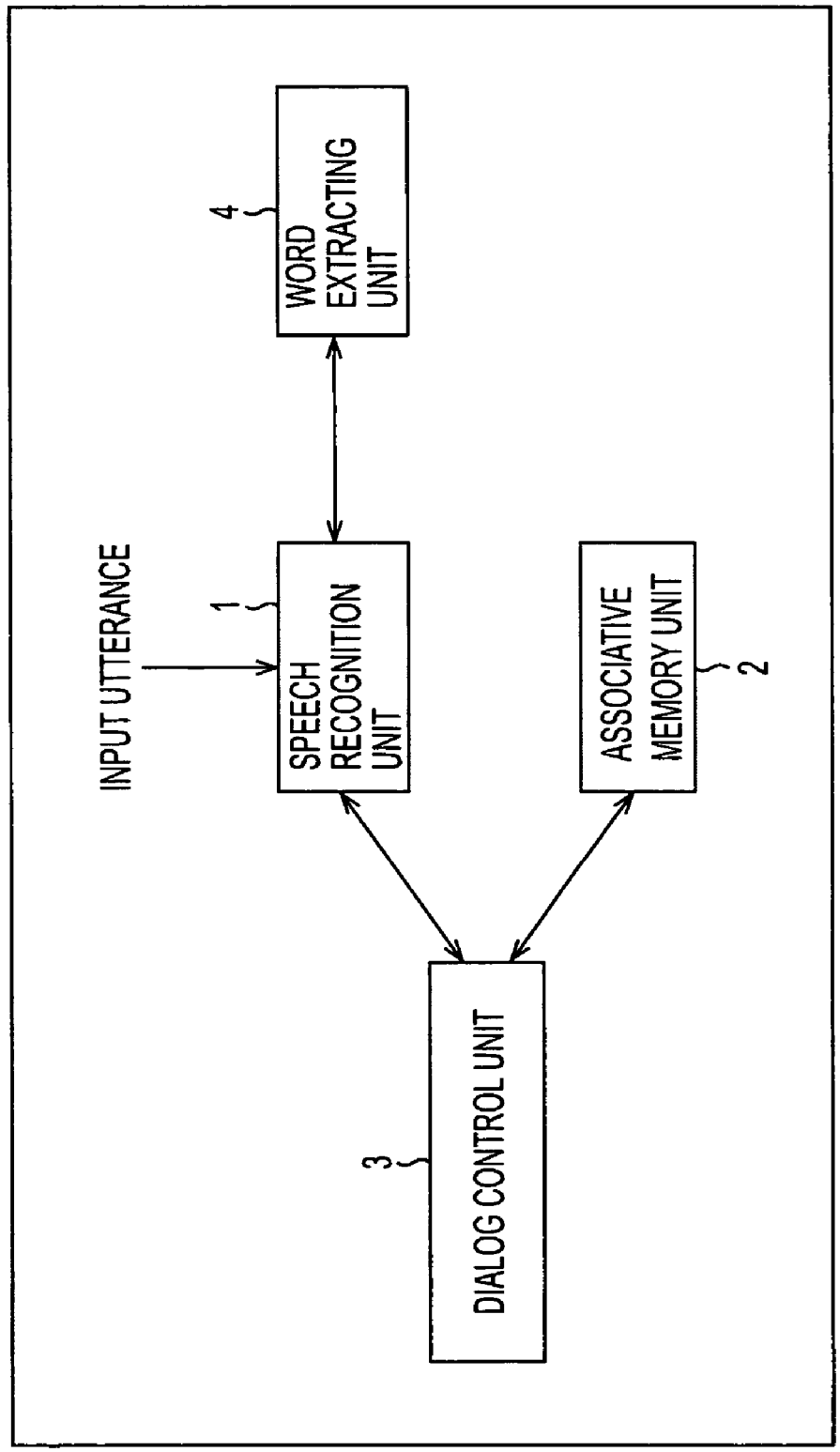
FIG. 5 shows an embodiment of a dialog system to which the present invention is applied.

Embodiments of the present invention will now be described with reference to the accompanying drawings. FIG. 5 shows an embodiment of a dialog system to which the present invention is applied.

This dialog system is integrated into, for example, a robot to communicate with a human user via speech. When speech is input, a user name is extracted from the speech to be registered.

That is, sound signals that the user utters are input to a speech recognition unit 1. The speech recognition unit 1 recognizes the input sound signals and outputs text and additional information, based on the result of the recognition, to a dialog control unit 3 and a word extracting unit 4 when needed.

The word extracting unit 4 automatically memorizes audio features of words that are not registered in a recognition dictionary of the speech recognition unit 1 so that the word extracting unit 4 can subsequently recognize the sounds of those words.

Figure 6:
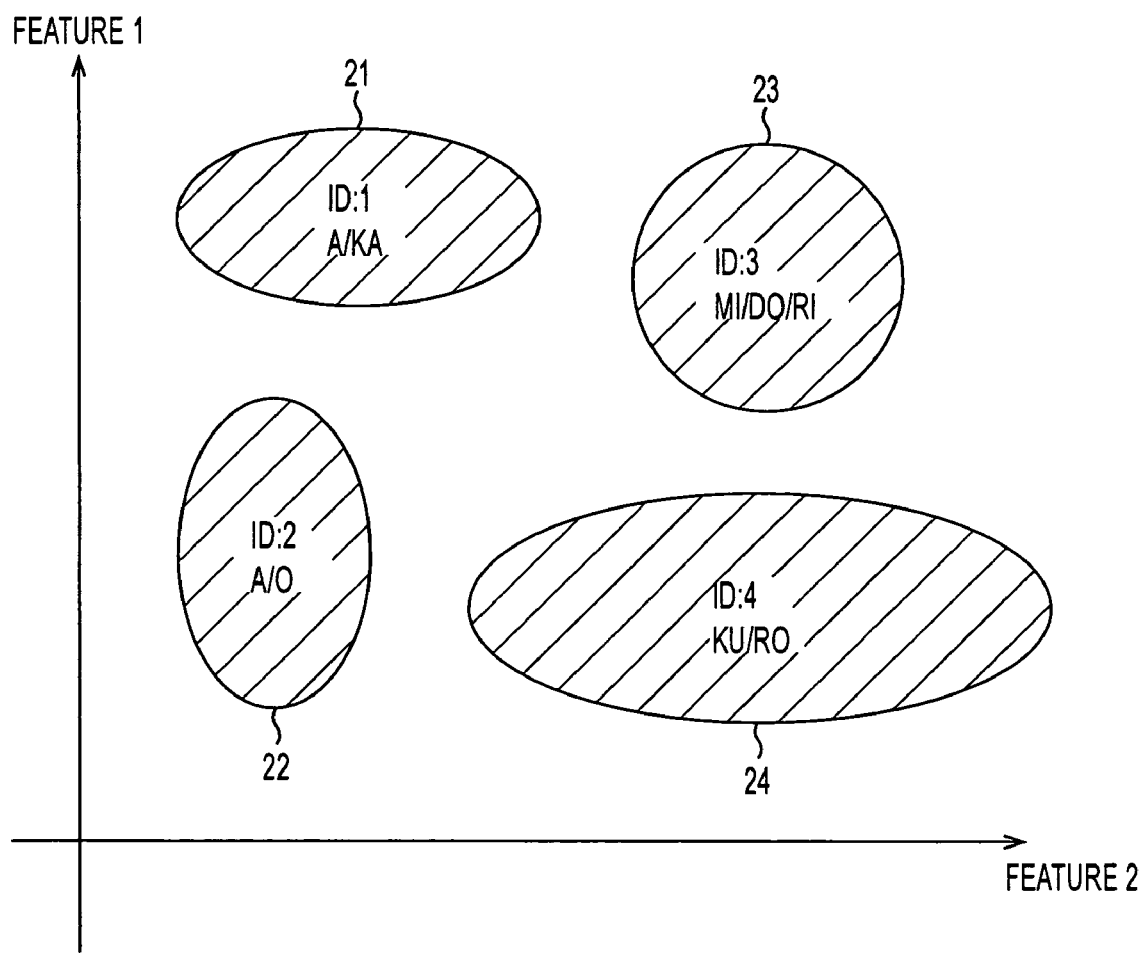
FIG. 6 shows an example of a cluster status.

That is, the word extracting unit 4 receives a pronunciation for the input sound from a syllable typewriter and then classifies it to several clusters. Each cluster has an ID and a representative syllable sequence. The clusters are managed based on the ID. The status of the cluster will now be described with reference to FIG. 6.

For example, three sounds "AKA", "AO", and "MIDORI" are input to the word extracting unit 4. The word extracting unit 4 classifies these three sounds to three corresponding clusters, an "AKA" cluster 21, an "AO" cluster 22, and a "MIDORI" cluster 23, respectively. Concurrently, the word extracting unit 4 assigns representative syllable sequences ("A/KA", "A/O", and "MI/DO/RI" in the case shown in FIG. 6) and IDs ("1", "2", and "3" in the case shown in FIG. 6) to the clusters.

If a sound "AKA" is input again, since a corresponding cluster exists, the word extracting unit 4 classifies the input sound to the "AKA" cluster 21. A new cluster is not created. In contrast, if a sound "KURO" is input, a corresponding cluster does not exist. The word extracting unit 4 creates a "KURO" cluster 24 and assigns a representative syllable sequence ("KU/RO" in the case shown in FIG. 6) and an ID ("4" in the case shown in FIG. 6) to the cluster.

Accordingly, it can be determined whether or not an input sound is an unacquired word by checking if a new cluster is created. Japanese Patent Application No. 2001-97843 by the present inventor discloses a detailed process for acquiring a word.

An associative memory unit 2 memorizes information such as a category which identifies that a registered name (unknown word) is a user name or a robot name. For example, in the case shown in FIG. 7, a pair of the cluster ID and the category name are memorized. In the example in FIG. 7, the cluster IDs "1", "3", and "4" belong to a "user-name" category and the cluster ID "2" belongs to a "robot-name" category.

The dialog control unit 3 understands the content of an utterance from the user based on the output of the speech recognition unit 1, and controls registration of the name (unknown word) based on the understanding. The dialog control unit 3 also controls subsequent dialogs, recognizing the registered name based on the information of the registered name memorized in the associative memory unit 2.

Figure 8:
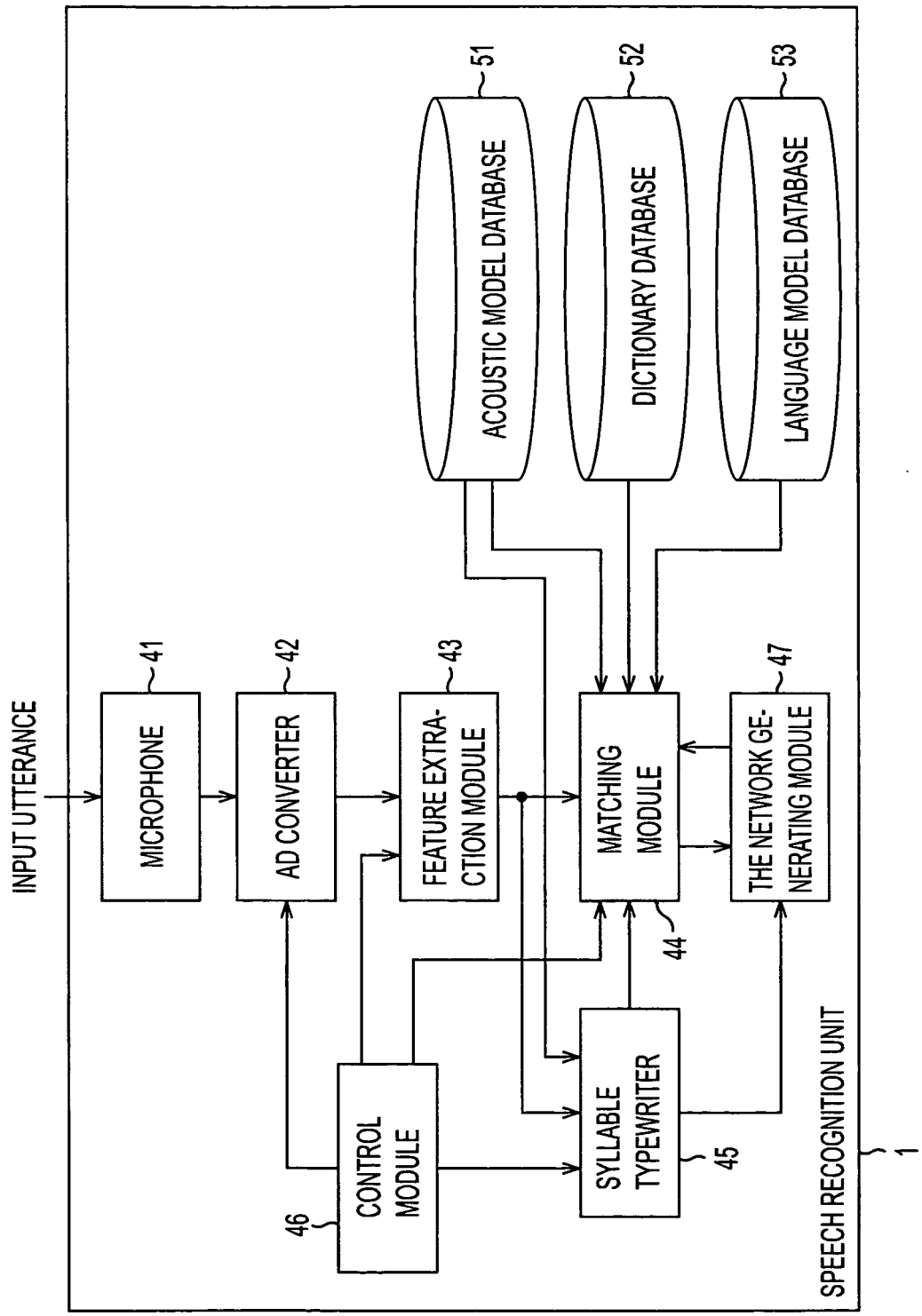
FIG. 8 is a block diagram of a configuration of a speech recognition unit shown in FIG. 5.

FIG. 8 shows a configuration of the speech recognition unit 1.

The speech recognition unit 1 includes a microphone 41, an analog-to-digital (AD) converter 42, a feature extraction module 43, a matching module 44, a syllable typewriter 45, a control module 46, a network generating module 47, an acoustic model database 51, a dictionary database 52, and a language model database 53.

An utterance from a user is input to the microphone 41, which converts the utterance to electrical audio signals. The audio signal is supplied to the AD converter 42. The AD converter 42 samples the analog audio signals from the microphone 41, quantizes, and then converts them to digital audio signals. These audio signals are delivered to the feature extraction module 43.

The feature extraction module 43 extracts feature parameters, such as a spectrum, power linear predictive coefficients, cepstrum coefficients, and a line spectrum pair, from each frame of the audio data, which is appropriately defined, output from the AD converter 42. The feature parameters are delivered to the matching module 44 and the syllable typewriter 45.

The matching module 44 finds the most likely word sequence for the utterance (input sound) input from the microphone 41 based on the feature parameters from the feature extraction module 43 with reference to the acoustic model database 51, the dictionary database 52, and the language model database 53. The matching module 44 then outputs the word sequence to the network generating module 47.

The acoustic model database 51 stores an acoustic model representing acoustic features of a language for the utterance to be recognized. The acoustic features include phonemes and syllables. For example, a Hidden Markov Model (HMM) may be used as an acoustic model. The dictionary database 52 stores a word dictionary describing information about pronunciations and a model describing chains of the phonemes and syllables for the words or phrases to be recognized.

As used herein, the term "word" refers to a unit suitable for the recognition process. It is not necessarily the same as a linguistic word. For example, "TAROUKUN" may be one word, or may be two words in the form of "TAROU" and "KUN". Further, a larger unit "KONNICHIWA-TAROUKUN" may be one word.

Additionally, the term "syllable" refers to a unit acoustically suitable for the recognition process. It is not necessarily the same as a phonetical syllable. For example, "TOU" in the word "TOUKYOU" may be represented by two syllable symbols "TO/U", or "TO:", which is a prolonged sound of "TO". Further, a symbol representing a silence may be adopted. Furthermore, symbols that classify the silence as "a silence before an utterance", "a short silence between utterances", "a silence in an utterance", and "a silence corresponding to 'TSU'" may be adopted.

The language model database 53 describes how words registered in the dictionary database 52 are chained or connected.

The syllable typewriter 45 captures a syllable sequence corresponding to the input utterance based on the feature parameters supplied from the feature extraction module 43, and then outputs the syllable sequence to both matching module 44 and network generating module 47. For example, from the speech "WATASHINONAMAEWAOGAWADESU", a syllable sequence "WA/TA/SHI/NO/NA/MA/E/WA/O/GA/WA/DE/SU" is captured. The syllable typewriter 45 may be commercially available.

Instead of a syllable typewriter, a mechanism that can capture a syllable sequence from any voice may be used. For example, speech recognition based on Japanese phonemes (a/i/u/e/o/k/a/k/i/ . . . ) or speech recognition based on another phonological unit or sub-word, which is a smaller unit than a word, may be used.

The control module 46 controls operations of the AD converter 42, the feature extraction module 43, the matching module 44, and the syllable typewriter 45.

The network generating module 47 generates a network of words and syllables based on a sub-word sequence (syllable sequence) from a syllable sequence captured by the syllable typewriter 45. That is, the network generating module 47 generates a path containing a syllable at the time corresponding to a boundary immediately before <OOV>, a path not containing this syllable, a path containing a syllable at the time corresponding to a boundary immediately after <OOV>, and a path not containing this syllable, which are all output to the matching module 44.

Figure 9:
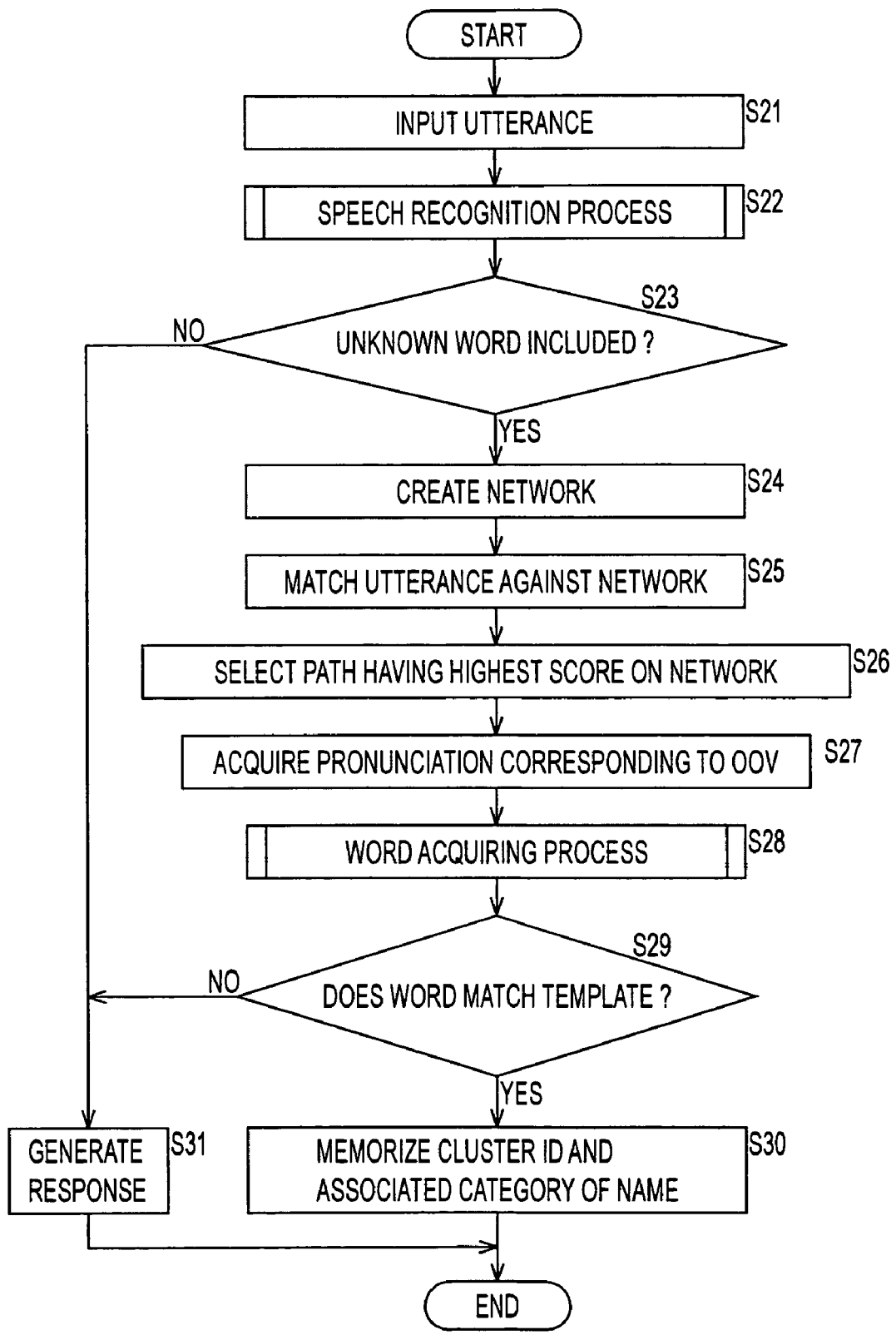
FIG. 9 is a flow chart for explaining the operation of the dialog system shown in FIG. 5.

A dialog process according to the present invention will now be described with reference to a flow chart in FIG. 9.

In step S21, a user inputs a voice into the microphone 41, which converts the voice to electrical audio signals. In step S22, the speech recognition unit 1 performs a speech recognition process.

Figure 10:
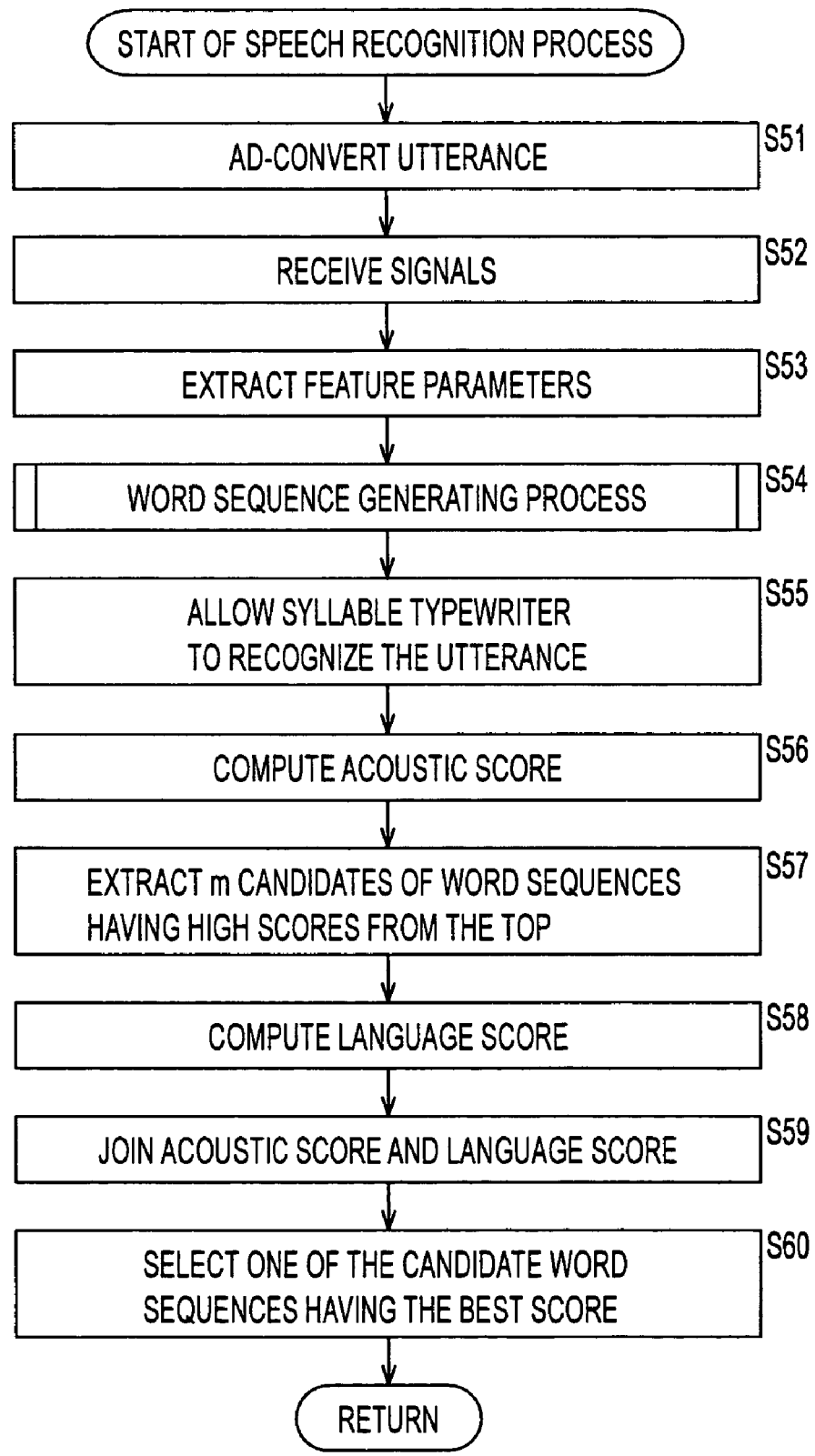
FIG. 10 is a flow chart for explaining in detail the speech recognition process of step S22 in FIG. 9.

The speech recognition process will now be described with reference to FIG. 10 in detail. In step S51, the AD converter 42 converts the audio signals generated by the microphone 41 to digital audio signals, and delivers them to the feature extraction module 43.

In step S52, the feature extraction module 43 receives the audio signals from the AD converter 42. Subsequently, the process proceeds to step S53, where the feature extraction module 43 extracts, for example, feature parameters of each appropriate frame, such as spectrum, power, and their time variations, and delivers them to the matching module 44.

Figure 11:
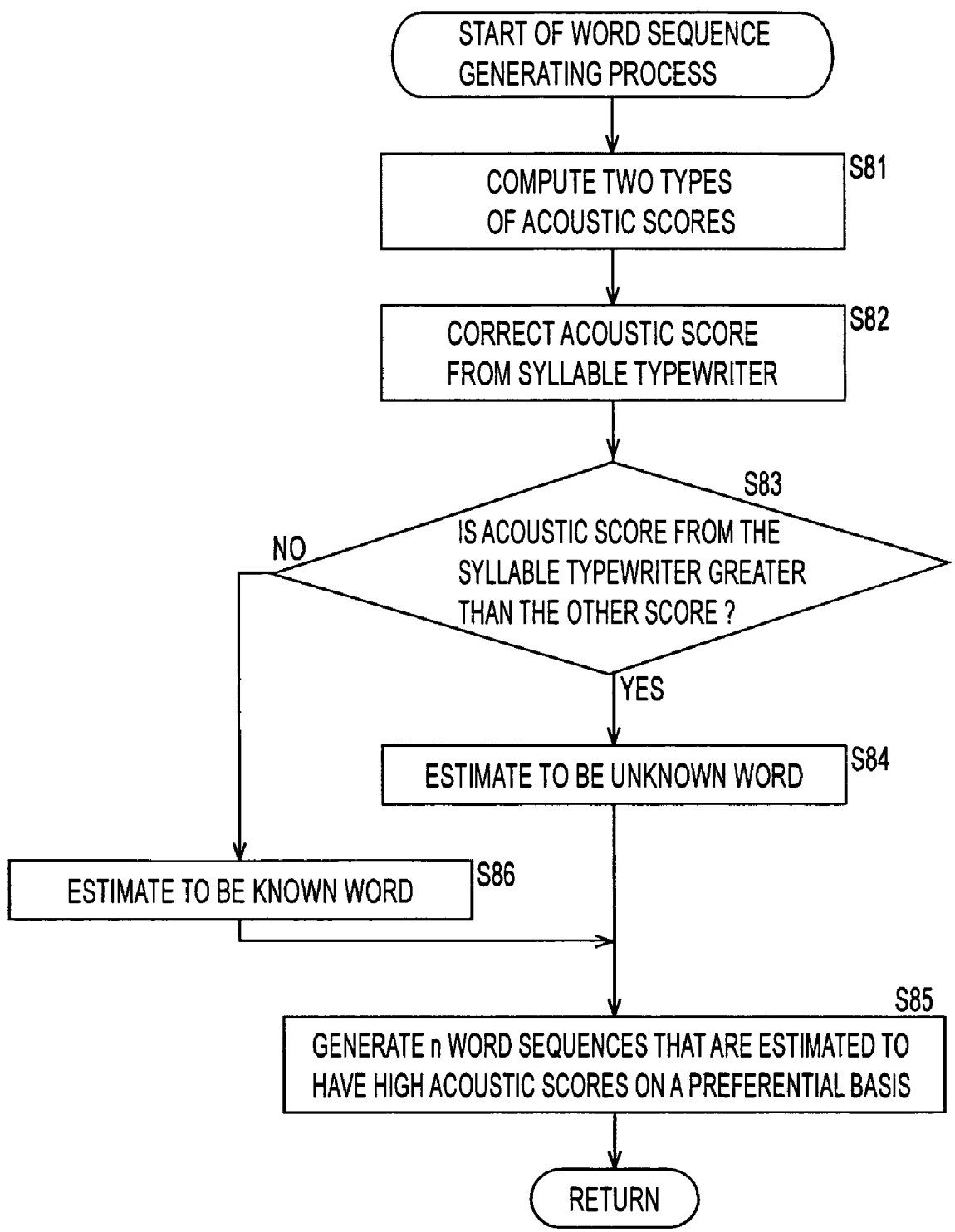
FIG. 11 is a flow chart for explaining in detail the word sequence generating process of step S54 in FIG. 10.

In step S54, the matching module 44 concatenates some of the word models stored in the dictionary database 52, and generates a word sequence. The word sequence contains "<OOV>", which is a symbol of an unknown word, as well as known words registered in the dictionary database 52. The word sequence generating process will now be described with reference to FIG. 11 in detail.

In step S81, the matching module 44 calculates two types of acoustic scores for some time duration of the input voice: an acoustic score resulting from a matching of the input voice with known words registered in the dictionary database 52 and an acoustic score received from the syllable typewriter 45 based on the input voice (in this case, part of "WA/TA/SHI/NO/NA/MA/E/WA/O/GA/WA/DE/SU"). The acoustic score indicates how closely a candidate of a word sequence resulting from the speech recognition resembles the input voice in terms of sound.

Subsequently, the acoustic score resulting from a matching of part of the input voice against known words registered in the dictionary database 52 is compared with the acoustic score received from the syllable typewriter 45 based on the input voice. Although the matching against the known words is performed word by word, the matching by the syllable typewriter 45 is performed syllable by syllable. Since the scales are different, the comparison is difficult. Generally, an acoustic score for syllables is larger than that for words. Accordingly, in step S82, the matching module 44 corrects the acoustic score from the syllable typewriter 45 in order to compare both acoustic scores on the same scale.

For example, the acoustic score from the syllable typewriter 45 is multiplied by some coefficient, or a predetermined value or a value proportional to a frame length is subtracted from the acoustic score from the syllable typewriter 45. As can be seen, since this process is relative, the acoustic score from the matching against known words may be corrected. The process is described in detail in "OOV-Detection in Large Vocabulary System Using Automatically Defined Word-Fragments as Fillers", EUROSPEECH99 Volume 1, Page 49-52.

In step S83, the matching module 44 compares the two acoustic scores, that is, the matching module 44 determines whether or not the acoustic score resulting from the recognition of the syllable typewriter 45 is greater, that is, better, than the other score. If the acoustic score from the syllable typewriter 45 is greater than the other score, the process proceeds to step S84, where the matching module 44 determines the span to be an out-of-vocabulary <OOV> word (unknown word).

If, in step S83, it is determined that the acoustic score from the syllable typewriter 45 is smaller than that from the matching against the known words, the process proceeds to step S86, where the matching module 44 determines the span to be a known word.

That is, for example, when an acoustic score from the syllable typewriter 45 for a span corresponding to "O/GA/WA" is greater than an acoustic score from the matching against the known words, a word "<OOV> (O/GA/WA)" is output as a word corresponding to the voice span. In contrast, if the acoustic score from the matching against the known words is greater than that from the syllable typewriter 45, the corresponding known word is output.

In step S85, the matching module 44 generates n word sequences that are estimated to have high acoustic scores on a preferential basis (a word sequence is a concatenation of several word models).

With reference again to FIG. 10, in step S55, the syllable typewriter 45 recognizes the feature parameters extracted in the process of step S53 based on phonemes independently from the process of step S54, and outputs a syllable sequence. For example, when a sound "WATASHINONAMAEWAOGAWADESU", where "OGAWA" is an unknown word, is input to the syllable typewriter 45, the syllable typewriter 45 outputs a syllable sequence "WA/TA/SHI/NO/NA/MA/E/WA/O/GA/WA/DE/SU".

In step S56, the matching module 44 computes an acoustic score for each word sequence generated in step 54. For a word sequence without <OOV> (unknown word), a known method is adopted, that is, feature parameters of the sound are input to each word sequence (a concatenation of word models) to compute a likelihood. On the other hand, for a word sequence with <OOV>, the known method cannot compute an acoustic score for the sound span corresponding to <OOV>, since a word model corresponding to <OOV> does not exist beforehand. Therefore, an acoustic score for the sound span is extracted from the recognition result of the syllable typewriter. The acoustic score is corrected to be employed as an acoustic score for <OOV>, which is further integrated to acoustic scores for other known words. The final score is used as a score for the word sequence.

In step S57, the matching module 44 extracts m candidates of word sequences having high scores from the top, where m≦n. In step S58, the matching module 44 computes a language score for each candidate with reference to the language model database 53. The language score indicates the appropriateness of the candidate word sequence in terms of language. The method for computing the language score will now be described in detail.

In order for the speech recognition unit 1 according to the present invention to recognize unknown words, a language model must support unknown words. An example using a grammar that supports unknown words, or a Finite State Automation (FSA), and an example using a tri-gram, which is one of the statistical language models, will now be described.

An example using a grammar will now be described with reference to FIG. 12. A grammar 61 is presented in Backus-Naur Form (BNF). In FIG. 12, "$A" means a variable, "A|B" means either A or B. "[A]" means that A is optional. "{A}" means that A is repeated zero or more times.

<OOV> is a symbol for an unknown word. Defining <OOV> in the grammar enables a word sequence containing an unknown word to be processed. Although "$ACTION" is not defined in FIG. 12, action names such as "KIRITU", "CHAKUSEKI", "OJIGI", and "AISATSU" are defined.

In the grammar 61, the following word sequences conforming to the grammar stored in the database are accepted or analyzed with the grammar: "<start>/KONNICHIWA/<end>", "<start>/SAYOUNARA/<end>", and "<start>/WATASHI/NO/NAMAE/WA/<OOV>/DESU/<end>", where "/" represents a separator of words. In contrast, the following word sequence that does not conform to the grammar stored in the database are not accepted or are not analyzed with the grammar: "<start>/KIMI/NO/<OOV>/NAMAE/<end>". "<start>" and "<end>" are special symbols that represent silences before and after an utterance, respectively.

To compute a language score by using this grammar, a parser (analyzer) is introduced. The parser classifies word sequences to a word sequence group accepted by the grammar and a word sequence group not accepted by the grammar. That is, for example, a language score 1 is given to an acceptable word sequence and a language score 0 is given to an unacceptable word sequence.

Consequently, for example, two word sequences "<start>/WATASHI/NO/NAMAE/WA/<OOV> (TA/RO/U)/DESU/<end>" and "<start>/WATASHI/NO/NAMAE/WA/<OOV> (JI/RO/U)/DESU/<end>" are converted to "<start>/WATASHI/NO/NAMAE/WA/<OOV>/DESU/<end>". Language scores for the word sequences are calculated and language score 1 (i.e. accepted) is output for both word sequences.

Additionally, after the grammar is converted to an equivalent Finite State Automation (hereinafter referred to as "FSA") or an approximate FSA, the FSA may determine whether or not a grammar of a word sequence is accepted for each word sequence.

Figure 13:
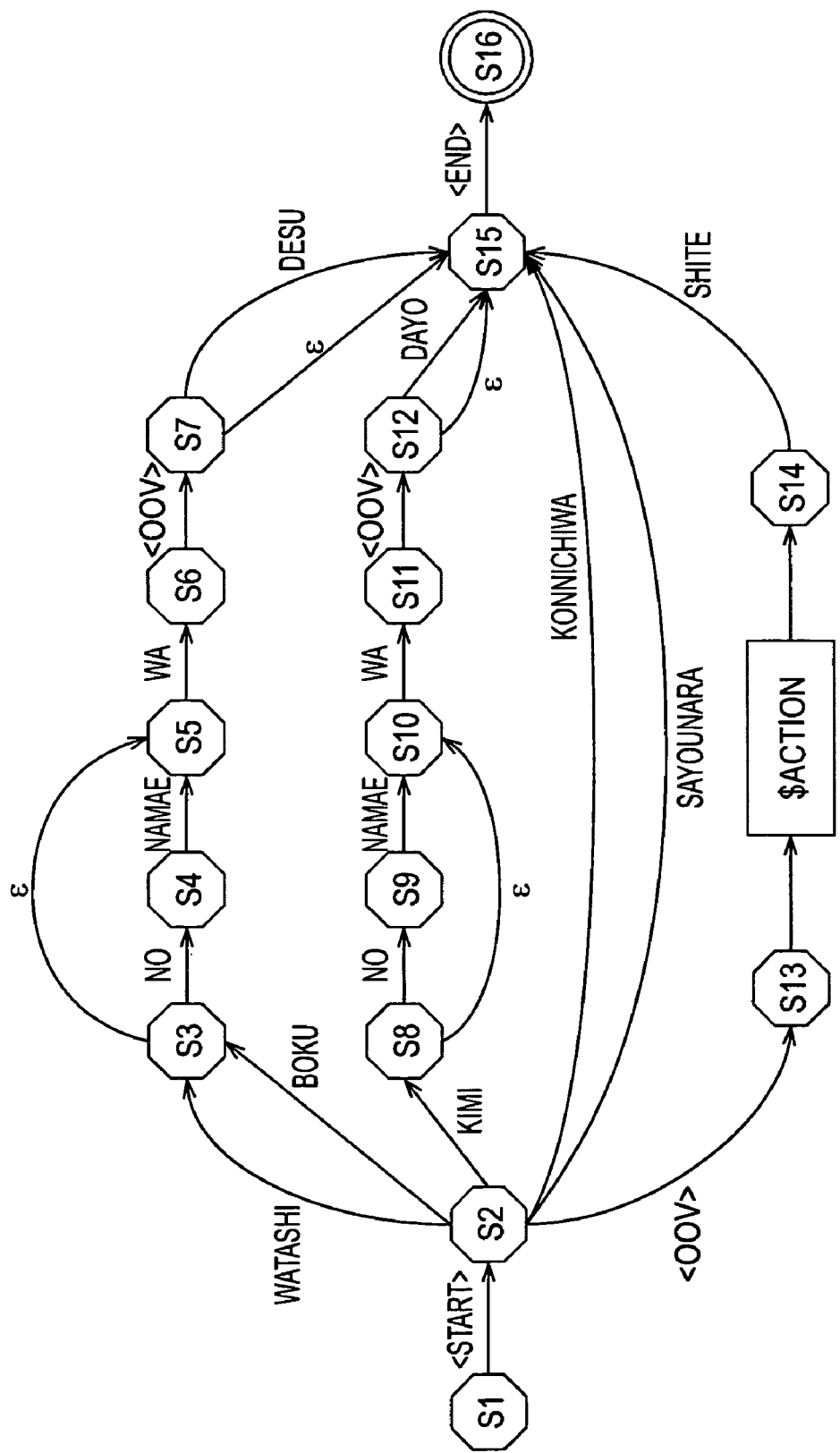
FIG. 13 shows an example of a language model with Finite State Automation.

FIG. 13 shows an example in which the grammar shown in FIG. 12 is converted to an equivalent FSA. An FSA is a directed graph including states (nodes) and paths (arcs). As shown in FIG. 13, S1 is an initial state and S16 is a final state. In practice, action names are registered as "$ACTION", as in FIG. 12.

A word is assigned to a path. When a transition from a predetermined state to the next state occurs, a path consumes the word. A path assigned "ε" is a special path that does not consume a word (hereinafter referred to as "ε-transition"). That is, for example, for "<start>/WATASHI/WA/<OOV>/DESU/<end>", a transition occurs from an initial state S1 to a state S2, consuming <start>, and then a transition occurs from the state S2 to a state S3, consuming "WATASHI". However, since a transition from state S3 to a state S5 is the ε-transition, no word is consumed during the transition. Thus, the transition from the state S3 to the next state S6 can occur after skipping from the state S3 to the state S5.

It is determined whether or not the FSA can accept a predetermined word sequence by determining whether or not the transition can reach the final state S16 after starting from the initial state S1.

That is, for example, for "<start>/WATASHI/NO/NAMAE/WA/<OOV>/DESU/<end>", a transition from an initial state S1 to a state S2 occurs, consuming the word "<start>". A transition from the state S2 to a state S3 then occurs, consuming the word "WATASHI". In the same manner, transitions from the state S3 to a state S4, from the state S4 to a state S5, from the state S5 to a state S6, and from the state S6 to a state S7 occur, and "NO", "NAMAE", "WA", and "<OOV>" are sequentially consumed. Subsequently, a transition from the state S7 to a state S15 occurs, consuming "DESU", and a transition from the state S15 to a state S16 occurs, consuming "<end>". Finally, the transition reaches a final state S16. Thus, "<start>/WATASHI/NO/NAMAE/WA/<OOV>/DESU/<end>" is accepted by the FSA.

In the case of "<start>/KIMI/NO/<OOV>/NAMAE/<end>", transitions from a state S1 to a state S2, from the state S2 to a state S8, and from the state S8 to a state S9 occur and consume "<start>", "KIMI", and "NO". However, a subsequent transition cannot occur and therefore cannot reach the final state S16. Thus, "<start>/KIMI/NO/<OOV>/NAMAE/<end>" is not accepted by the FSA.

An example in which a language score is computed using a tri-gram, which is one of the statistical language models, will now be described with reference to FIG. 14. In the statistical language models, a generation probability of the word sequence is found to be the language score. That is, for example, the language score of "<start>/WATASHI/NO/NAMAE/WA/<OOV>/DESU/<end>" in a language model 71 shown in FIG. 14 is represented by a generation probability of the word sequence shown in line 2. This is also represented by a product of conditional probabilities shown in the lines 3 to 6. Herein, for example, "P(NO|<start> WATASHI)" is the appearance probability of "NO" under the condition that the immediately preceding word of "NO" is "WATASHI" and the immediately preceding word of "WATASHINO" is "<start>".

In the tri-gram, equations shown in lines 3 to 6 in FIG. 14 are approximated by conditional probabilities of three consecutive words shown in lines 7 to 9. These probabilities are obtained with reference to a tri-gram database 81 shown in FIG. 15. The tri-gram database 81 is achieved by analyzing a large amount of text in advance.

In an example shown in FIG. 15, probability $P(w3|w1\ w2)$ of three consecutive words $w1$, $w2$, and $w3$ is shown. For example, when the three words $w1$, $w2$, and $w3$ are "<start>", "WATASHI", and "NO", respectively, the probability is 0.12. When the three words $w1$, $w2$, and $w3$ are "WATASHI", "NO", and "NAMAE", respectively, the probability is 0.01. When the three words $w1$, $w2$, and $w3$ are "<OOV>", "DESU", and "<end>", respectively, the probability is 0.87.

Of course, "P(W)" and "P(w2|w1)" are also found in advance.

As described above, introducing the entry process of <OOV> in the language model allows a language score for a word sequence including <OOV> to be computed. Consequently, the symbol <OOV> can be output in the result of the recognition.

Additionally, in the case of other language models, the entry process of <OOV> allows a language score for a word sequence including <OOV> to be computed.

Furthermore, in the case of language models without a <OOV> entry, a mechanism that maps <OOV> to an appropriate word enables the language score to be computed. For example, when a tri-gram database that does not have "P(<OOV>|WATASHIWA)" is adopted, a language score for "P(<OOV>|WATASHIWA)" can be computed by accessing the database with "P(OGAWA|WATASHIWA)" and using its probability in place of "P(<OOV>|WATASHIWA)".

With reference again to FIG. 10, the matching module 44, in step S59, joins the acoustic score and the language score. In step S60, the matching module 44 selects and outputs one of the candidates of the word sequences having the best score based on the joined scores computed in step S59. This is the recognition result of the matching module 44.

In the case that the language model is an FSA, as the joining process in step S59, the word sequence may be deleted or left depending upon whether the language score is zero or non-zero, respectively.

With reference again to FIG. 9, after the speech recognition is performed in step S22 as described above, the control module 46 of the speech recognition unit 1, in step S23, determines whether or not the recognized word sequence includes an unknown word. If, in step S23, it is determined that an unknown word is included, the network generating module 47 generates a network of words and sub-words (for example, syllables) based on the word sequence and the sub-word sequence resulting from the syllable sequence output from the syllable typewriter 45. That is, a path containing a syllable at the time corresponding to a boundary immediately before <OOV>, a path not containing this syllable, a path containing a syllable at the time corresponding to a boundary immediately after <OOV>, and a path not containing this syllable are generated and output to the matching module 44.

In step S25, the matching module 44 matches the utterance from a user with the network based on the sub-word sequence, that is, the syllable sequence supplied from the syllable typewriter 45 and the network supplied from the network generating module 47.

Figure 16:
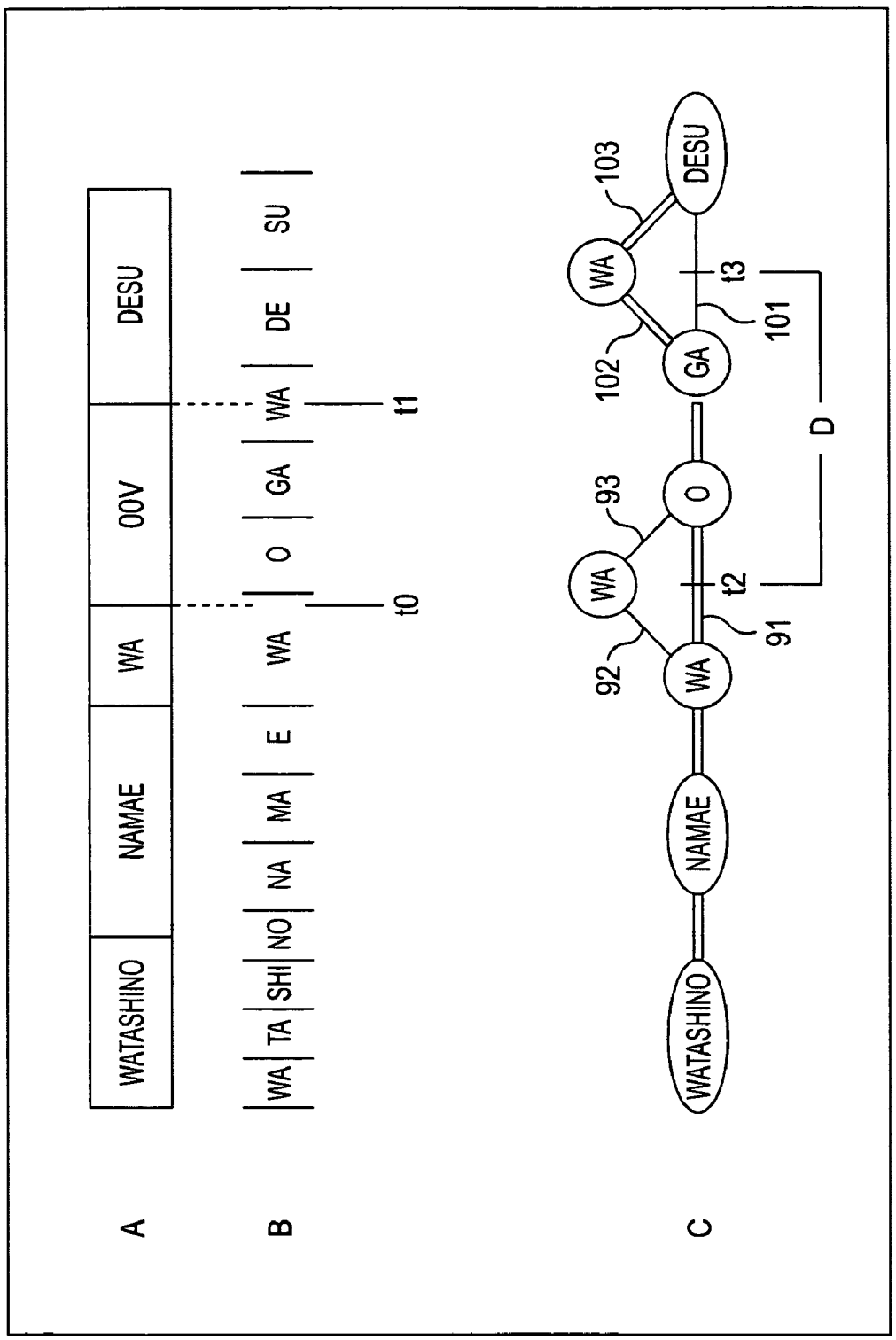
FIG. 16 is a diagram for explaining the creation of a network.

FIG. 16 is a diagram explaining the creation of the network. For example, a user inputs the speech "WATASHI-NONAMAEWAOGAWADESU", where "OGAWA" is an unknown word, to the microphone 41. The matching module 44 selects and outputs a candidate of the word sequences having the best score based on the joint score of the obtained acoustic score and language score. For example, as shown in FIG. 16A, "<start>/WATASHI/NO/NAMAE/WA/<OOV>/DESU/<end>" is output as the recognition result. Concurrently, the syllable typewriter 45 outputs, as shown in FIG. 16B, the syllable sequence "WA/TA/SHI/NO/NA/MA/E/WA/O/GA/WA/DE/SU".

In this case, as shown in FIGS. 16A and 16B, boundaries in the word sequence acquired from the recognition result of the matching module 44 do not generally match boundaries in the syllable sequence acquired from the syllable typewriter 45. In the case of FIGS. 16A and 16B, the boundary between the word "WA" and the word "<OOV>" in the word sequence corresponds to the syllable "WA" in the syllable sequence. The boundary between the word "<OOV>" and the word "DESU" in the word sequence corresponds to the syllable "WA" (the last "WA") in the syllable sequence. Therefore, when the boundary between the word "WA" and the word "<OOV>" in the word sequence does not match the syllable "WA" in the syllable sequence, the syllable "WA" is sometimes included in the word "WA" and sometimes included in the word "<OOV>" in the word sequence.

To solve this problem, a network of words and syllables is generated. That is, a path containing a syllable at the time corresponding to a boundary immediately before <OOV>, a path not containing this syllable, a path containing a syllable at the time corresponding to a boundary immediately after <OOV>, and a path not containing this syllable are generated.

For example, as shown in FIGS. 16B and 16C, based on the feature parameter of time information output from the feature extraction module 43, the times defined by the syllable typewriter 45 corresponding to frames for the syllable "WA" and the syllable "WA" (the last one) in the sub-word sequence are $t_0$ and $t_1$, respectively. Times $t_2$ and $t_3$ in the word sequence correspond to the times $t_0$ and $t_1$ defined by the syllable typewriter, respectively. With reference to FIG. 16C, the duration D between the word "WA" immediately before "<OOV>" and the word "DESU" immediately after "<OOV>" is composed of syllables "WA", "O", "GA", and "WA", which are possible syllables corresponding to the pronunciation for <OOV>.

AS shown in FIG. 16C, at the boundary between the word "WA" and the word "<OOV>" in the word sequence, a path 91 that does not contain the syllable "WA", and paths 92 and 93 that contain the syllable "WA" are generated. At the boundary between the word "<OOV>" and the word "DESU" in the word sequence, a path 101 that does not contain the syllable "WA", paths 102 and 103 that contain the syllable "WA" are generated. Accordingly, a sub-word sequence on the best network for the input voice can be selected without determining boundaries in the sub-word sequence.

In the case of FIG. 16, after matching the input voice against the network of words and syllables, the network generates the following four sentence hypotheses:

WATASHINO-NAMAE-WA-WA-O-GA-WA-DESU
WATASHINO-NAMAE-WA-WA-O-GA-DESU
WATASHINO-NAMAE-WA-O-GA-WA-DESU
WATASHINO-NAMAE-WA-O-GA-DESU

With reference again to FIG. 9, in step S26, the matching module 44 selects paths having high scores (for example, the paths 91, 102, and 103 in FIG. 16) based on the result of matching between the voice input from a user and the network. In step S27, the matching module 44 acquires a pronunciation corresponding to <OOV> ("O/GA/WA" in the case shown in FIG. 16) based on paths on the network selected in step S26 (for example, the paths 91, 102, and 103 in FIG. 16) and the sub-word sequence output from the syllable typewriter 45.

FIGS. 17 and 18 show the result of an experiment according to the present invention. The conditions of the experiment are identical to those in FIG. 3, and therefore those descriptions are omitted.

FIG. 17 shows the performance in terms of recognition accuracy of a syllable sequence, substitution error, deletion error, and insertion error in percent. The detailed description for each item is identical to that in FIG. 4 and therefore its description is omitted. As can be seen from the result in FIG. 17, the recognition accuracy was 48.5%, which is improved compared to that of 40.2% by the <OOV> pronunciation acquiring method in the sub-word sequence. The appearance probabilities of deletion error and insertion error are 11.6% and 8.0%, respectively. Compared to those of 33.3% and 4.1% in the method for acquiring the pronunciation of <OOV> in sub-word sequence, the balance of both rates is improved, that is, the difference between both rates is decreased.

FIG. 18 shows an example of part of the recognition result for <OOV>s in one person's utterances according to the present invention.

As shown in FIG. 18, in a first recognition, "KUROSAKI" was recognized as "KUROTACHI", where substitution errors occurred in "TA" and "CHI". In a second recognition, "KUROSAKI" was recognized as "OROSA", where a deletion error of "KU" and substitution error to "O" occurred. In a third recognition, "KUROSAKI" was recognized as "ROSAKI", where a deletion error of "KU" occurred. In a fourth recognition, "KUROSAKI" was recognized as "ROSAKI", where a deletion error of "KU" occurred. Finally, in a fifth recognition, "KUROSAKI" was recognized as "KUROSAKI", that is, no error occurred.

"KAZUMI", in a first recognition, was recognized as "KAZUMI", where no error occurred. For example, in a second recognition, "KAZUMI" was recognized as "KATSUNI", where substitution errors for "ZU" and "MI" occurred. In a third recognition, "KAZUMI" was recognized as "KAZUMI", where no error occurred. In a fourth recognition, "KAZUMI" was recognized as "KATSUMI", where a substitution error for "ZU" occurred. In a fifth recognition, "KAZUMI" was recognized as "KASUMI", where a substitution error for "ZU" occurred.

With reference again to FIG. 9, the control module 46 controls the word extracting unit 4 to, in step S28, execute a word acquiring process for acquiring an unknown word.

The word acquiring process will now be described with reference to FIG. 19 in detail. In step S111, the word extracting unit 4 extracts feature parameters of an unknown word (<OOV>), in particular, feature parameters of time information from the speech recognition unit 1. In step S112, the word extracting unit 4 determines whether or not the unknown word belongs to existing clusters. If the unknown word does not belong to the existing clusters, the word extracting unit 4, in step S113, creates a new cluster corresponding to the unknown word. Then, in step S114, the word extracting unit 4 outputs an ID of the cluster, to which the unknown word belongs, to the matching module 44 of the speech recognition unit 1.

In step S112, if the unknown word belongs to one of the existing clusters, the word extracting unit 4 need not create a new cluster, and therefore the word extracting unit 4 skips the process in step S113. The process proceeds to step S114, where the word extracting unit 4 outputs the ID of the existing cluster, to which the unknown word belongs, to the matching module 44.

Figure 19:
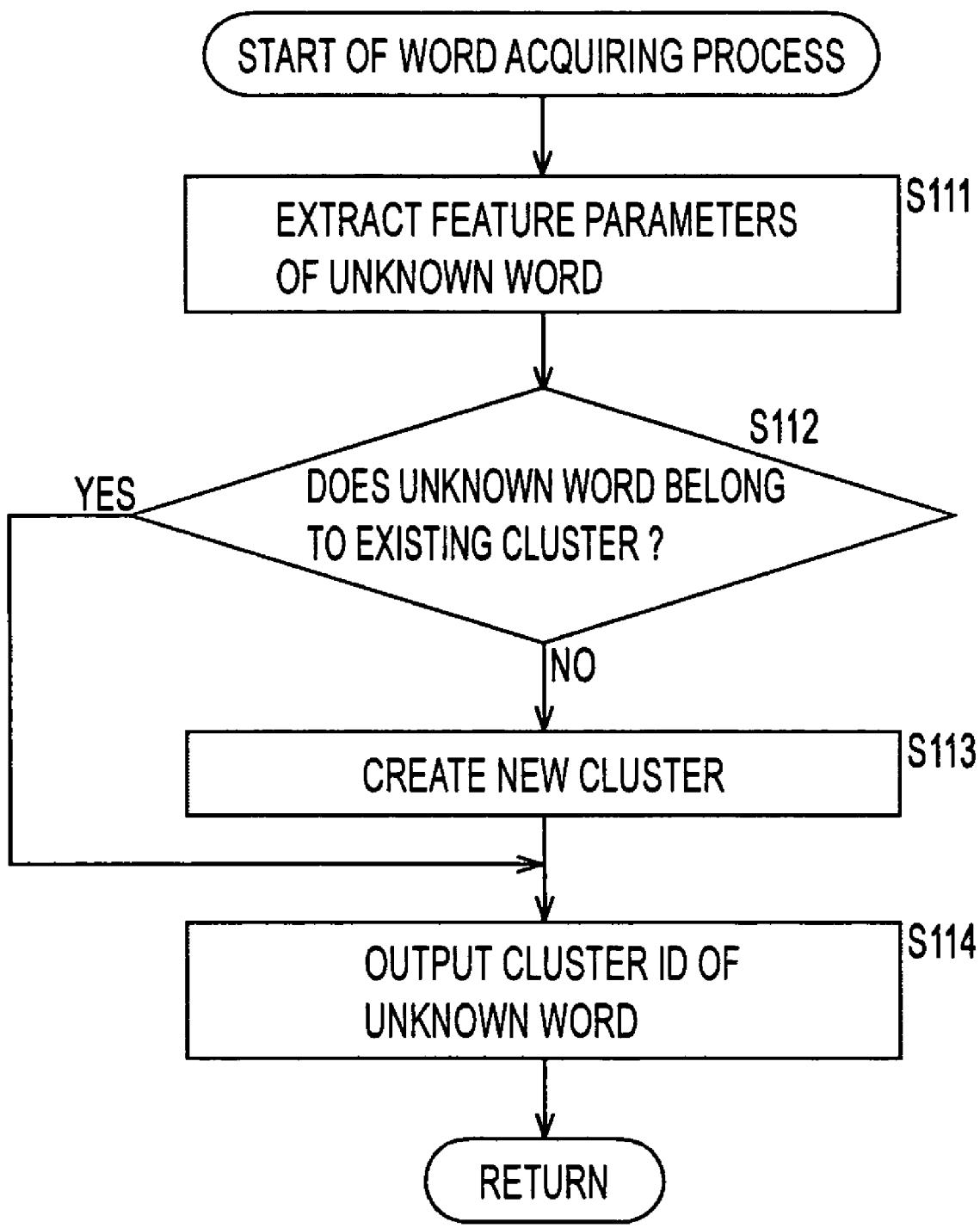
FIG. 19 is a flow chart for explaining in detail the word acquiring process of step S28 in FIG. 9.

The process in FIG. 19 is executed for each unknown word.

With reference again to FIG. 9, after the word acquiring process in step S28, the dialog control unit 3, in step S29, determines whether or not a word sequence acquired in step S28 matches a template. In other words, in this step, it is determined whether or not the recognized word sequence requires registering some name. Subsequently, if, in step S29, the recognized word sequence matches the template, the dialog control unit 3, in step S30, controls the associative memory unit 2 to memorize a cluster ID of the name and its category.

An example of the template which the dialog control unit 3 uses for matching will now be described with reference to FIG. 20. In FIG. 20, "/A/" means "if a word sequence A is included" and "A|B" means either A or B. "." means any single character and "A+"means one or more repetitions of A. "(.)+" means any character sequence.

A template 121 indicates that, if the recognized word sequence matches the regular expression in the left column in the drawing, the corresponding operation in the right column is performed. For example, if the recognized word sequence is "<start>/WATASHI/NO/NAMAE/WA/<OOV>(O/GA/WA)/DESU/<end>", the character sequence generated from this recognition result "WATASHINONAMAEWA<OOV>DESU" matches the second regular expression in FIG. 20. Consequently, the corresponding operation "Register cluster ID corresponding to <OOV> as a user name" is performed. That is, if a cluster ID of "<OOV>(O/GA/WA)" is "1", as shown in FIG. 5, the category name for the cluster ID "1" is registered as "user name".

Additionally, for example, if the recognized word sequence is "<start>/KIMI/NO/NAMAE/WA/<OOV>(A/I/BO)/DAYO/<end>", the character sequence generated from this recognition result "KIMINONAMAEWA<OOV>DAYO" matches the first regular expression in FIG. 20. Consequently, if a cluster ID of "<OOV>(A/I/BO)" is "2", the category name for the cluster ID "2" is registered as "robot name".

Some dialog systems have only one type of registered words (for example, only "user name"). In this case, the template 121 and the associative memory unit 2 can be simplified. For example, the template 121 contains the operation "if a recognition result includes <OOV>, then the ID of <OOV> is registered" and the associative memory unit 2 memorizes only the cluster ID.

The dialog control unit 3 utilizes the above-described information registered to the associative memory unit 2 to process the determination in the subsequent dialog. For example, the dialog system is required for the following process:

determining whether or not an utterance from a user contains a robot name;

determining that the dialog system is called from the user if the utterance contains a robot name;

sending back an appropriate reply if the robot name is contained.

Alternatively, the dialog system is required for the following process:

allowing the robot to speak the user name.

In these cases, the dialog control unit 3 can acquire a word for the robot name (an entry whose category name is "robot name") or a word for the user name (an entry whose category name is "user name") by referencing the information in the associative memory unit 2.

On the other hand, if, in step S23, the recognition result does not contain an unknown word or, in step S29, the recognition result does not match the template, the dialog control unit 3, in step S31, generates a reply for the input utterance. That is, a name (unknown word) is not registered and a predetermined process for the input utterance from the user is performed.

When a grammar is used as a language model, the grammar may include a description corresponding to the function of a syllable typewriter. FIG. 21 shows an example of the grammar in this case. In a grammar 131, a variable "$SYLLABLE" in the first line contains all the syllables concatenated with "|", which means "or". Therefore, $SYLLABLE represents one of the syllable symbols. A variable "OOV" represents zero or more repetitions of "$SYLLABLE", namely, a concatenation of zero or more repetitions of any one of the syllable symbols. This description functions as a syllable typewriter. Consequently, "$OOV" between "WA" and "DESU" in the third line can accept any pronunciation.

In the recognition result using the grammar 131, a plurality of the symbols are output for "$OOV". For example, the recognition result of "WATASHINONAMA-EWAOGAWADESU" is "<start>/WATASHI/NO/NAMAE/WA/O/GA/WA/DESU/<end>". After this is converted to "<start>/WATASHI/NO/NAMAE/WA/<OOV>(O/GA/WA)/DESU", processes following step S23 can be performed in the same manner as in the syllable typewriter.

In the above-described embodiment, a category is registered as unknown word information; however, other information may be registered. Additionally, step S28 of the flow chart in FIG. 9 may be eliminated. In this case, in step S30, the dialog control unit 3 controls the associative memory unit 2 to memorize a pair of sub-word sequences and its corresponding category.

Furthermore, in the above-described embodiment, a network of syllables and words is generated as shown in FIG. 16C; however, all that is required is that a sub-word sequence on the best network for maximizing the likelihood of an input utterance be selected. Accordingly, a network of sub-words other than syllables, such as phonemes and other phonological units, and words can be used.

Figure 22:
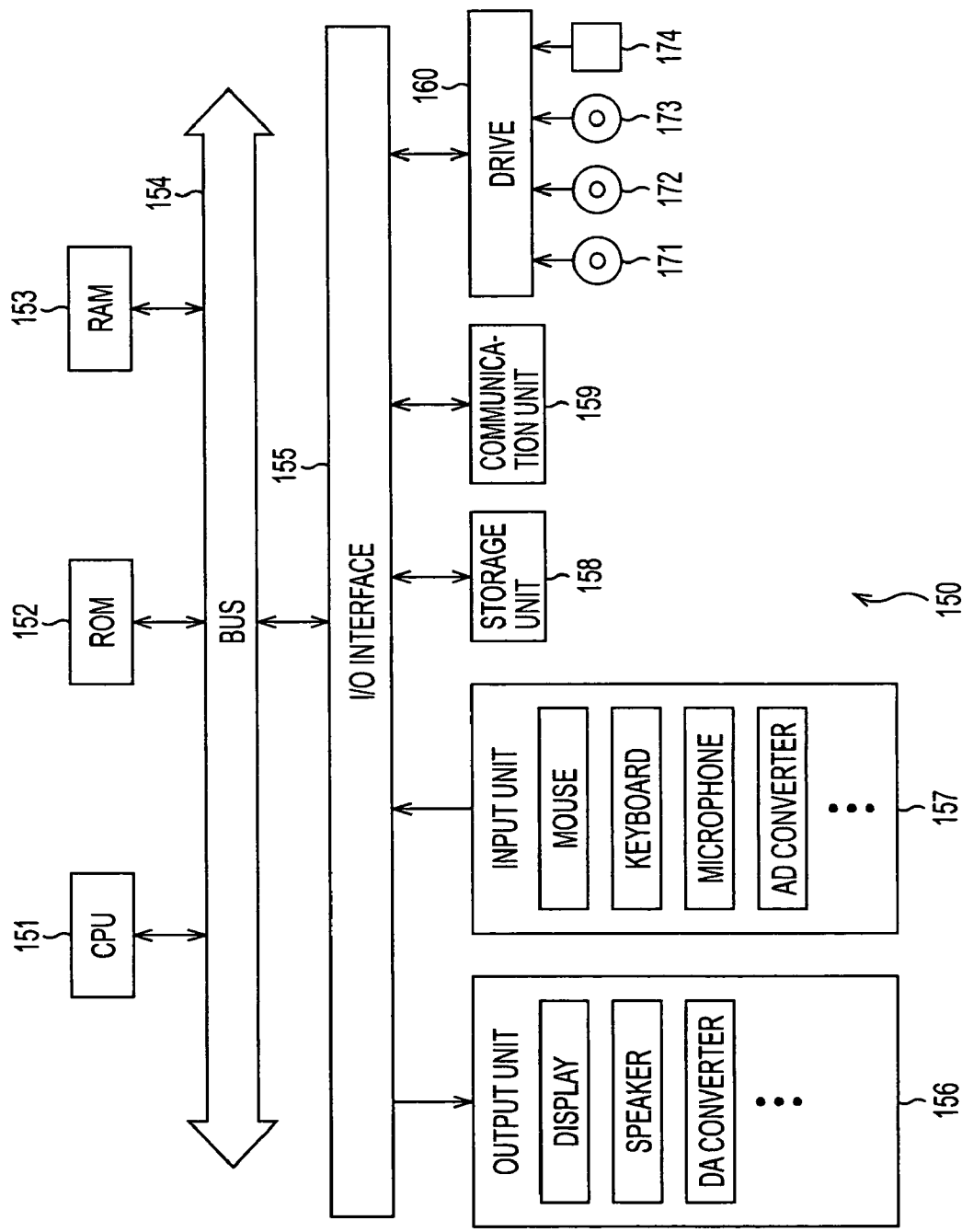
FIG. 22 is a block diagram of the configuration of a computer according to an embodiment of the present invention.

FIG. 22 shows the configuration of a personal computer 150 which executes the above-described process. The personal computer 150 incorporates a central processing unit (CPU) 151. An I/O interface 155 is connected to the CPU 151 via a bus 154. A read only memory (ROM) 152 and a random access memory (RAM) 153 are connected to the bus 154.

An input unit 157 including input devices, such as a mouse, a keyboard, which a user operates, a microphone, and an AD converter, and an output unit 156 including output devices, such as a display, a speaker, and a DA converter, are connected to the I/O interface 155. Also, a storage unit 158 including a hard disk drive that stores programs and various types of data and a communication unit 159 that communicates data over a network, such as the Internet, are connected to the I/O interface 155.

An optional drive 160 which reads and writes data to and from storage media, such as a magnetic disk 171, an optical disk 172, an optical magnetic disk 173, and a semiconductor memory 174, is connected to the I/O interface 155.

A speech processing program allowing the personal computer 150 to function as a speech processing device according to the present invention is stored in the magnetic disk 171 including a floppy disk, the optical disk 172 including a Compact Disk-Read Only Memory (CD-ROM) and a Digital Versatile Disc (DVD), the optical magnetic disk 173 including a Mini Disc (MD), or the semiconductor memory 174. The speech processing program in the storage medium is supplied to the personal computer 150 and is installed into the hard disk drive in the storage unit 158 while being read by the drive 160. In response to a command from the CPU 151, which corresponds to a user command input from the input unit 157, the speech processing program installed in the storage unit 158 is loaded from the storage unit 158 to the RAM 153 to run.

The above-described process can be executed by either hardware or software. In the case of a software process, a program that executes the software process is installed in a computer assembled in dedicated hardware or a general-purpose personal computer, which can execute various types of programs after installation, via a network or storage media.

With reference to FIG. 22, the storage media include not only packaged media, such as the magnetic disk 171, the optical disk 172, the optical magnetic disk 173, or the semiconductor memory 174, which is distributed to a user to provide the program separately from a device body, but also the ROM 152 or the hard disk in the storage unit 158 which stores the program and is provided to the user along with the device body.

In the present specification, the steps that describe the program stored in the storage media include not only processes executed in the above-described sequence, but also processes that may be executed in parallel or independently.

In addition, as used in the present specification, "system" refers to a logical combination of a plurality of devices; the plurality of devices are not necessarily included in one body.

INDUSTRIAL APPLICABILITY

As described above, according to the present invention, a word can be registered in the form of pronunciation. In addition, the registration can be carried out without a user being aware of the registration mode. Further, unknown words can be extracted from a continuous input utterance containing known words and unknown words, pronunciations of the unknown words can be retrieved, and the unknown words can be reliably acquired. As a result, the unknown words can be easily registered. Furthermore, the registered words can be utilized for subsequent dialog.

Additionally, according to the present invention, recognition accuracy of the speech recognition can be increased. Also, the deletion error rate during acquisition of unknown words can be reduced, and the deletion error rate and the insertion error rate can be balanced. Consequently, users seldom deem a robot incorporating this continuous speech recognition system to be unintelligent.

The invention claimed is:

1. A speech processing device, including a processor, for processing an input utterance and registering a word contained in the input utterance based on the processing result, comprising:
   recognition means for recognizing a continuous input utterance;
   unknown word determination means for determining whether a result of recognition by the recognition means contains an unknown word;
   network generating means for generating a network having two kinds of paths when the unknown word determination means determines that the result of recognition by the recognition means contains the unknown word;
      wherein a first kind of path includes particular sub-words corresponding to word boundaries on one side or both sides of the unknown word, and
      wherein a second kind of path does not include the particular sub-words,
         wherein the particular sub-words are sub-words at positions where boundaries of the unknown words correspond to halfway points of the sub-words;
   acquiring means for acquiring a word corresponding to the unknown word when the unknown word determination means determines that the result of recognition by the recognition means contains the unknown word; and
   registering means for registering the word acquired by the acquiring means while associating the word with other information.

2. The speech processing device according to claim 1, further comprising pattern determination means for determining whether the result of the recognition matches a predetermined word sequence,
   wherein the registering means registers the word if the result of the recognition matches the predetermined word sequence.

3. The speech processing device according to claim 2, further comprising reply generating means for generating a reply signal corresponding to the input utterance when the unknown word determination means determines that the result of the recognition does not contain an unknown word or the pattern determination means determines that the result of the recognition does not match the predetermined word sequence.

4. The speech processing device according to claim 2, wherein the registering means registers the word while associating the word with a category serving as the other information.

5. The speech processing device according to claim 2, wherein the registering means registers the other information while associating the other information with the matched pattern if the pattern determination means determines that the result of the recognition matches the word sequence.

6. The speech processing device according to claim 1, wherein the acquiring means acquires the word by clustering the unknown words.

7. The speech processing device according to claim 1, wherein the network generated by the network generating means is a network of words and syllables.

8. The speech processing device according to claim 7, further comprising:
   selecting means for selecting a path having the highest score in the network based on matching between the input utterance and the network; and
   pronunciation acquiring means for acquiring a pronunciation for the unknown word based on the network containing the path selected by the selecting means.

9. The speech processing device according to claim 1, further comprising:
   comparison means for comparing an acoustic score obtained by matching a predetermined duration of the input utterance against known words with an acoustic score obtained by recognition of a syllable typewriter,
   wherein the comparison means estimates that the duration corresponds to an unknown word if the acoustic score by recognition of a syllable typewriter is superior to the other score.

10. The speech processing device according to claim 9, wherein the comparison means compares the acoustic score obtained by matching a predetermined duration of the input utterance against known words with the acoustic score obtained by recognition of a syllable typewriter after the comparison means corrects the acoustic score obtained by recognition of a syllable typewriter.

11. A speech processing method, utilizing a processor in a speech processing device that processes an input utterance and registers a word contained in the input utterance based on the processing result, comprising the steps of:
   recognizing a continuous input utterance, utilizing a recognition unit;
   determining whether a result of recognition in the recognition step contains an unknown word, utilizing an unknown word determination unit;
   generating a network having two kinds of paths, utilizing a network generating unit,
      wherein a first kind of path includes particular sub-words corresponding to word boundaries on one side or both sides of the unknown word, and
      wherein a second kind of path does not include the particular sub-words when the determining step determines that the result of recognition contains the unknown word;
         wherein the particular sub-words are sub-words at positions where boundaries of the unknown words corresponds to halfway points of the sub-words;
   acquiring a word corresponding to the unknown word when the determining step determines that the result of recognition contains the unknown word, utilizing an acquiring unit; and
   registering the word acquired in the acquiring step while associating the word with other information, utilizing a registering unit.

12. A storage medium for storing a computer-readable program executed in a speech processing device for processing input utterances and registering words contained in the input utterances, wherein the computer-readable program comprises the steps of:
   recognizing a continuous input utterance;
   determining whether a result of recognition in the recognition step contains an unknown word;
   generating a network having two kinds of paths, when the determining step determines that the result of recognition contains the unknown word, wherein a first one kind of path includes particular sub-words corresponding to word boundaries on one side or both sides of the unknown word, and
wherein a second kind of path does not include the particular sub-words,
 wherein the particular sub-words are sub-words at positions where boundaries of the unknown words correspond to halfway points of the sub-words;

acquiring a word corresponding to the unknown word when the determining step determines that the result of recognition contains the unknown word; and
registering the word acquired in the acquiring step while associating the word with other information.

\* \* \* \* \*

UNITED STATES PATENT AND TRADEMARK OFFICE
CERTIFICATE OF CORRECTION

| | | |
|---|---|---|
| PATENT NO. | : 7,653,541 B2 | Page 1 of 1 |
| APPLICATION NO. | : 10/502169 | |
| DATED | : January 26, 2010 | |
| INVENTOR(S) | : Hiroaki Ogawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1135 days.

Signed and Sealed this

Twenty-eighth Day of December, 2010

David J. Kappos
*Director of the United States Patent and Trademark Office*